United States Patent [19]

Jenkins

[11] Patent Number: 4,689,368
[45] Date of Patent: Aug. 25, 1987

[54] POLYMERIZATION OF CONJUGATED DIENES

[75] Inventor: Derek K. Jenkins, Ashurst, England

[73] Assignee: Enoxy Chemical Limited, Southhampton, England

[21] Appl. No.: 892,821

[22] Filed: Aug. 4, 1986

Related U.S. Application Data

[62] Division of Ser. No. 480,806, Mar. 31, 1983, Pat. No. 4,619,982.

[30] Foreign Application Priority Data

Apr. 1, 1982 [GB] United Kingdom ............... 8209712

[51] Int. Cl.$^4$ ........................................... C08F 295/00
[52] U.S. Cl. ................................... 525/247; 525/314; 526/127; 526/128; 526/151; 526/164
[58] Field of Search ............... 526/127, 128, 151, 164; 525/247

[56] References Cited

U.S. PATENT DOCUMENTS

| | | | |
|---|---|---|---|
| 2,921,060 | 1/1960 | Stuart | 526/164 |
| 2,953,531 | 9/1960 | Anderson | 526/164 |
| 3,118,864 | 1/1964 | Robinson et al. | 526/164 X |
| 3,151,104 | 9/1964 | Robinson | 526/164 X |
| 4,242,232 | 12/1980 | Sylvester | 526/164 |
| 4,429,089 | 1/1984 | Pedretti | 526/164 |
| 4,520,177 | 5/1985 | Jenkins | 526/151 |

FOREIGN PATENT DOCUMENTS 865248  4/1961  United Kingdom ............... 526/164

*Primary Examiner*—Paul R. Michl
*Attorney, Agent, or Firm*—Cushman, Darby & Cushman

[57] ABSTRACT

The invention relates to a catalyst system comprising (a) a compound of a rare earth element and, as cocatalyst, a second component (b) comprising an organomagnesium compound. In the polymerization of a conjugated diene this catalyst gives a polymer having a very high content of trans 1,4 isomer. A third component (c) which is a Lewis acid alters the reaction to give a polymer having a very high content of cis 1,4 isomer. If desired reaction can be initiated using components (a) and (b) alone and component (c) then added at the desired conversion to produce a block polymer having a block of high trans content followed by a block of high cis content.

10 Claims, No Drawings

POLYMERIZATION OF CONJUGATED DIENES

This is a division of application Ser. No. 480,806 filed Mar. 31, 1983, now U.S. Pat. No. 4,619,982.

This invention relates to the polymerisation of conjugated diene monomers using a catalyst system containing a compound of a rare earth element, i.e. an element having an atomic number of 57 to 71 inclusive.

In recent years the use of various catalyst systems containing rare earth compounds for the polymerisation of conjugated diene monomers has been disclosed. Examples of such disclosures are (1) Mazzei A., Makromol. Chem. Suppl. 4 61 (1981); (2) Witte J., Angew. Makromol. Chem. 94 119 (1981); (3) Shen Tse-Chuan et al., J. Pol. Sci. Polym. Chem. Ed. 18 3345 (1980); (4) Marwede G. and Sylvester G., Trans. 22nd Annual Proceedings of the International Institute of Synthetic Rubber Producers, Madrid Paper III-3 (1981). Such catalyst systems have two or three components, for example a lanthanoid alkyl, alkoxide or salt (e.g. neodymium tricarboxylate) with an organoaluminium compound and optionally a Lewis Acid. When used in the polymerisation of conjugated dienes, they yield a product which has a high content of cis isomer (e.g. 98% for polybutadiene and 94% for polyisoprene), except when a $\pi$-allyl complex of a rare earth such as $Ln(allyl)_4$.dioxane, where Ln is a lanthanide element, is used which gives a polymer of predominantly trans 1,4 content, and which needs no cocatalyst. Such $\pi$-allyl catalysts are described in the paper by Mazzei referred to above and appear to proceed by an ionic mechanism.

In one embodiment, the present invention comprises a two component catalyst for the homo polymerisation of a conjugated diene or the copolymerisation of a conjugated diene with one or more other conjugated dienes comprising (a) a salt of a rare earth element or a complex of a rare earth element and (b) an organo magnesium compound.

The invention also includes the use of a catalyst, as just defined, in the homo polymerisation of a conjugated diene or the copolymerisation of a conjugated diene with one or more other conjugated dienes. Surprisingly the product of such a polymerisation employing an organo magnesium compound as cocatalyst is a conjugated diene polymer having a very high content of trans isomer. This contrasts with the two or three component rare-earth-containing prior art systems, referred to above, which use an organo aluminium compound as cocatalyst and which, as already mentioned, yield a product having a high content of cis isomer.

In a second embodiment the invention comprises a three component catalyst for the homopolymerisation of a conjugated diene or the copolymerisation of a conjugated diene with one or more other conjugated dienes comprising (a) a salt or a rare earth metal or a complex of a rare earth metal, (b) an organomagnesium compound and (c) a Lewis acid in which the mole ratio of component (c) to component (b) is at least 0.5:1 and preferably in the range 0.5:1 to 2:1 and the use of such a catalyst in the polymerisation of a conjugated diene as aforesaid.

Surprisingly the addition of the third component does not kill the catalyst by reaction with component (b) to produce inactive $MgCl_2$ but instead it changes the reaction mechanism to give a catalyst system which yields a product having a very high content of cis isomer. All three components of the catalyst are essential to obtain the high cis polymer and omission of the organomagnesium compound, component (b), produces only very small amounts of polymer, if any.

The rare earth element in component (a) of the catalyst may be any of those having an atomic number of 57 (lanthanum) to 71 (Jutetium). However, the polymerisation activity of certain of these elements, e.g. samarium or europium, is known to be low. Therefore a compound of cerium, praseodymium, neodymium, gadolinium, terbium or dysprosium is preferred. A compound of two or more rare earth elements may be used. A compound of neodymium or "didymium" (which is a mixture of rare earth elements containing approximately 72% neodymium, 20% lanthanum and 8% praseodymium) is preferred. Preferably component (a) is soluble in hydrocarbon polymerisation medium, examples being the carboxylates, alkoxides and diketones. Examples of compounds for use as component (a) are "didymium" versatate (derived from versatic acid, a synthetic acid composed of a mixture of highly branched isomers of C10 monocarboxylic acids, sold by Shell Chemicals), praseodymium (2,2,6,6-tetramethyl-3,5-heptane dione). "Didymium" and especially neodymium "versatate" are preferred on the grounds of ready solubility, ease of preparation and stability.

Component (b) of the catalyst is an organo magnesium compound. Dihydrocarbyl magnesium compounds of formula $R_2Mg$ where each R, which may be the same or different, is for example, an alkyl (including cycloalkyl), aryl, aralkyl, allyl or cyclodiene group. Dialkyl magnesium compounds, where each alkyl group has from 1 to 10 carbon atoms, are preferred. Magnesium dibutyl is particularly preferred on the grounds of ease of availability. The organo magnesium compound may also be a hydrocarbon soluble Grignard reagent of formula RMgX where R is a hydro-carbyl group such as exemplified above and X is chlorine, bromine or iodine.

The molar ratio of component (a) to component (b) is preferably 0.01:1 to 0.5:1 more preferably 0.06:1 to 0.3:1. Absolute concentration of component (b) may be for example, 1 to 5 millimoles per hundred grams of polymerisable monomer.

Component (c), where used, is a Lewis acid, a particularly preferred Lewis acid being ethyl aluminium sesqui chloride. Other examples are ethyl aluminium sesqui bromide and diethyl aluminium chloride or less preferred, ethyl aluminium dichloride and aluminium tribromide. Silicon tetrachloride and methyl silicon trichloride also produce high cis polymer when used in place of ethyl aluminium sesquichloride but yields are low unless an aluminium trialkyl (e.g. $AlEt_3$ or $AliBu_3$ is used. As had been found by a number of workers, a source of halide is necessary for good polymerisation activity using rare earth catalysts and an aluminium containing cocatalyst. If desired in the present invention halogen may be supplied by the use of an organic halogen compound e.g. a simple short chain ($C_1-C_5$) halogen containing hydrocarbon. Examples are carbon tetrachloride, chloroform and alkyl halides and again yield is increased in the presence of aluminium alkyl. Reaction is carried out in hydrocarbon reaction medium, for example, hexane, cyclohexane or toluene and it is very desirable that the catalyst components are soluble in the reaction medium used. An aliphatic solvent, e.g. hexane, or cycloaliphatic solvent, e.g. cyclohexane, or toluene is preferred.

A reaction temperature of for example, 0° to 90°C., is convenient, more preferably 20°C. to 80°C. and pressure is slightly elevated, e.g. up to 10 atmospheres, because of the vapour pressure of the monomer(s) under the reaction conditions used. Generally the molecular weight of the polymer is lower if a higher polymerisation temperature is used and vice versa. Molecular weight also increases with polymerisation time suggesting a catalyst system which is at least partially living.

Examples of conjugated diene monomers which may be polymerised by the process of the invention are butadiene and isoprene although the process is not restricted to the use of one or other of these two conjugated dienes. Mixtures of conjugated dienes may be used if desired.

The preferred order of addition of catalyst components is to add the monomer to the solvent first followed by component (a) and then component (b) and, if used, finally component (c) in that order.

As mentioned above, the addition of the Lewis acid component component (c), gives a catalyst system which yields a conjugated diene polymer having a very high content of cis isomer. We have found that block polymers may be prepared by beginning the polymerisation with components (a) and (b) alone to produce a block having a high trans content and then at the desired conversion adding component (c) to alter the reaction giving a block of high cis content.

Another modification of the reaction conditions may be produced by adding a lithium alkyl, such as n-butyl lithium, to a polymerisation using components (a) and (b) as catalyst. At low molar ratios of lithium alkyl: magnesium alkyl e.g. below 0.5:1, the lithium alkyl enhances yield with virtually no effect on microstructure. Using higher molar ratios than 0.5:1 (e.g. up to 1.5:1), the trans content of the polymer may be decreased from 96% to about 50% (decreasing as the proportion of lithium alkyl is increased). In the presence of lithium alkyl, a vinyl aromatic monomer such as styrene may be copolymerised with the conjugated diene which offers the possibility of preparing a styrene-butadiene copolymer having a trans content in the range of 50–90%.

It is particularly preferred and beneficial to carry out the polymerisation using components (a) and (b) alone in the presence of a polar compound, typically a Lewis base such as tetrahydrofuran. Examples of other polar compounds are (a) ethers such as dimethyl ether, diethyl ether, 1,2 dimethoxy ethane, diphenyl ether, dibenzyl ether and anisole: (b) amines such as trimethylamine, triethylamine pyridine or tetra methyl ethylene diamine; (c) thioethers such as thiophene and (d) polyethers such as glyme or diglyme. These polar compounds are well known in the art but their use in the present invention enables higher conversions of monomer to polymer to be obtained with no effect on trans content unless very high levels (greater than about 2.5:1 molar ratio polar compound: component (b)) are used. Surprisingly addition of a polar compound produces no increase in vinyl content of the polymer, in contrast to the increase in vinyl content such compounds produce in anionic polymerisations.

As can be seen from the above the process of the invention offers the possibility of preparing a wide variety of conjugated diene polymers (1) a polymer of high trans 1,4 content, by using components (a) and (b);

(2) a polymer of high cis 1,4 content, by using component (c) in addition;

(3) a block polymer having a high trans block and a high cis block, by initiating the polymerisation using components (a) and (b) alone and adding component (c) at the desired degree of conversion. Some homopolymers of high trans content and high cis content respectively may also be formed in this reaction.

(4) a polymer of medium trans 1,4 content e.g. 50–80% by modification of the reaction using components (a) and (b) with lithium alkyl; optionally carrying out the polymerisation in the presence of a vinyl aromatic monomer, such as styrene, to obtain e.g. a styrene-butadiene copolymer of medium trans 1,4 content.

These polymers are rubbery (except the polymers of high trans content) and may be compounded and vulcanised by methods well known in the art. They are of potential application in tires, general rubber goods and in the preparation of plastics materials such as high impact polystyrene.

The following examples illustrate the invention:

EXAMPLE 1

In this example, didymium versate $(Di(C_9H_{19}CO_2)_3)$ where Di is "didymium" was used as component (a) of the catalyst. It was prepared by reacting sodium versate (obtained from "Versatic"* acids sold by Shell) with didymium chloride in aqueous solution to give a sticky white precipitate which was then extracted with toluene. The toluene solution was evaporated to dryness on a Buchi evaporator and the solid extracted with toluene and filtered into bottles.

*"Versatic" is a Shell Trade Mark and Versatate is otherwise known as nonanoate.

A crown capped bottle was part filled with hexane (100 ml) and butadiene (14.9 g) added. Didymium versate (hereinafter DiV) was injected followed by dibutyl magnesium, the molar ratio of DiV to MgBu, being 0.06:1 and the magnesium dibutyl concentration being 2.6 mMole per 100 gram of butadiene. The bottle was then placed in a waterbath at 50°C. After 24 hours a conversion to polymer of 77.9% was obtained. The polymer microstructure was trans 1,4 97.8%, cis 1,4 5.6% and vinyl 0.2%.

EXAMPLES 2 to 8 .

These examples show the effect of adding various amounts of lithium butyl, a Group IA organometallic compound to the polymerisation reaction. In each case, the procedure of Example 1 was used, the molar ratio of DiV:MgBu$_2$ being 0.06:1. In Examples 2 to 4 the MgBu$_2$ concentration was 2.6 mMole per 100 g of butadiene. In Examples 5 to 8 a reduced concentration of 1.9 mMole per 100 g of butadiene was used. The amount of butadiene (Bd) used in each case, the amount of lithium butyl and the results obtained are given (together with those from Example 1 (no LiBu) are given in the table:

| Ex | LiBu:MgBu$_2$ Molar Ratio | MgBu$_2$ Conc. | Bd (g) | % Conv. | Microstructure trans | cis | vinyl |
|---|---|---|---|---|---|---|---|
| 1 | — | 2.6 | 14.9 | 77.9 | 97.8 | 0.2 | 2.0 |
| 2 | 0.05:1 | 2.6 | 18.1 | 91.7 | 97.4 | 0.3 | 2.3 |
| 3 | 0.1:1 | 2.6 | 18.3 | 93.4 | 97.2 | 0.6 | 2.2 |
| 4 | 0.2:1 | 2.6 | 19.6 | 94.9 | 97.7 | 0.2 | 2.1 |
| 5 | 0.4:1 | 1.9 | 14.5 | 60.0 | 94.3 | 2.9 | 2.7 |
| 6 | 0.6:1 | 1.9 | 15.4 | 63.0 | 89.4 | 7.2 | 3.4 |
| 7 | 0.8:1 | 1.9 | 16.7 | 82.6 | 79.2 | 15.8 | 4.8 |

-continued

| Ex | LiBu:MgBu$_2$ Molar Ratio | MgBu$_2$ Conc. | Bd (g) | % Conv. | Microstructure trans | cis | vinyl |
|---|---|---|---|---|---|---|---|
| 8 | 1.0:1 | 1.9 | 16.7 | 88.0 | 68.4 | 25.3 | 6.2 |

These Examples show that small quantities of lithium butyl exert a beneficial effect on yield, with virtually no effect on microstructure. However above a molar ratio of about 0.5:1 LiBu:MgBu$_2$, some decrease in conversion and/or trans content of the resultant polymer is obtained

EXAMPLES 9 to 15

In these examples DiV/MgBu$_2$ was used as the catalyst in a ratio DiV:MgBu$_2$ of 0.1:1. Aluminium triethyl was added at an AlEt$_3$:MgBu$_2$ molar ratio of 0.19:1. A polar compound, in this case an ether, tetrahydrofuran (THF) was added to the system in varying amounts as shown, with the results, in the table. Reaction time was 16 hours at 50°C. and magnesium butyl concentration was 2.6 mMole per 100 g of butadiene.

| Ex | THF:MgBu$_2$ Molar Ratio | Bd | Conv. | Trans | cis | vinyl |
|---|---|---|---|---|---|---|
| 9 | 0.2:1 | 16.0 | 83.1 | 97.6 | 0.7 | 1.7 |
| 10 | 0.6:1 | 15.7 | 83.4 | 98.7 | 0.3 | 1.0 |
| 11 | 1.2:1 | 18.3 | 83.6 | 98.2 | 0.2 | 1.6 |
| 12 | 2.4:1 | 18.8 | 75.0 | 96.8 | 1.2 | 2.0 |
| 13 | 4.8:1 | 18.8 | 57.4 | 96.9 | 1.4 | 1.7 |
| 14 | 7.2:1 | 15.3 | 35.3 | 94.3 | 3.0 | 2.5 |
| 15 | 9.6:1 | 18.2 | 25.3 | 94.8 | 3.2 | 1.9 |

It can be seen that the polar compound (THF) surprisingly has no effect on trans content, nor is the vinyl content increased, but at very high levels (greater than about 2.5:1 molar ratio polar compound:MgBu$_2$) conversion is substantially reduced.

These examples 9 to 15 were repeated omitting the aluminium triethyl with essentially the same results showing that aluminium triethyl has substantially no effect on the polymerisation process.

EXAMPLES 16 to 19

In these examples butadiene was polymerised using DiV:MgBu$_2$ of 0.1:1 at a molar ratio MgBu$_2$ of 2.6 mMole per 100 g of butadiene. Reaction was at 50°C. as in the previous examples and the reaction time 16 hours. Ethyl aluminium sesquichloride (EASC) was added to the polymerisation in varying mole ratios relative to MgBu$_2$ as shown with the results obtained below. Addition of the EASC did not destroy the normal yellow colour of the polymerisation.

| Ex | EASC:MgBu$_2$ Ratio | Conv. % | Trans | cis | vinyl |
|---|---|---|---|---|---|
| 16 | 0.3:1 | 45.8 | 96.9 | 1.2 | 1.7 |
| 17 | 0.6:1 | 13.7 | 81.2 | 16.4 | 2.3 |
| 18 | 1.2:1 | 32.9 | 14.3 | 84.4 | 1.1 |
| 19 | 1.5:1 | 87.6 | 9.0 | 90.4 | 0.6 |

As can be seen, the conversion dropped to a minimum as the proportions of Lewis acid (EASC) increased and then the conversion increased to a very high level. At the same time the polymer microstructure surprisingly changed from a high trans content to a high cis content. Thus by modification of the catalyst with a weak Lewis Acid such as EASC a polymer of high cis microstructure may readily be obtained in good yield especially at a molar ratio of Lewis acid to MgBu$_2$ of 1 or more: 1.

EXAMPLE 20

Butadiene (18.2 g) was polymerised using Pr(2,2,6,6-tetramethyl-3,5-heptane dione)$_3$, hereinafter Pr(THD)$_3$, as rare earth compound made up in toluene. MgBu$_2$ was used as component (b) at a concentration of 2.6 mMole per hundred gram of butadiene and EASC as component (c). The mole ratios used a:b:c were 0.1:1:1.5 17.3 g polybutadiene (95.1% conversion) was obtained. The microstructure was 95.9% cis, 3.6 trans and 0.5% vinyl.

Omission of component (c) in a similar experiment gave a conversion of 52.1% with a polymer microstructure of 96.9% trans, 1.9% cis and 1.2% vinyl.

EXAMPLES 21-23

In this example a block polymer having a block of high trans content and a block high cis content was prepared by polymerising butadiene in hexane at 50°C. with a catalyst of (a) didymium versatate and (b) dibutyl magnesium and adding (c) ethyl aluminium sesquichloride (EASC) part way through the polymerisation. The dibutyl magnesium concentration was 2.6 mMole/100 g. of butadiene and the molar ratio (a):(b):(c) was 0.1:1:1.5. The time of addition of component (c) is shown, with the conversion to polymer and polymer microstructure in the table.

| Ex. No. | Time of EASC addition | Conv. | Trans | Cis | Vinyl |
|---|---|---|---|---|---|
| 21 | 30 mins. | 78.1% | 18.6 | 80.5 | 0.7 |
| 22 | 45 mins. | 77.6% | 31.1 | 68.1 | 0.8 |
| 23 | 60 mins. | 89.1% | 51.4 | 47.6 | 1.0 |

The polymer could not be separated by solvent fractionation but, in contrast, mixtures of the corresponding homopolymers with the same overall microstructure prepared in separate experiments were separated easily and completely. This evidence suggests the formation of at least some, and probably a high proportion of, block polymer possibly accompanied by some homopolymer of high trans content and some homopolymer of high cis content. Furthermore the product was soluble at 20°C. in hexane whereas a high trans homopolybutadiene is not soluble under these conditions, again indicating the formation of a block polymer.

The polymer product of Example 24 was mouldable to an opaque white sheet having some elasticity and was remouldable at 150°C., thus showing thermoplastic elastomeric properties. A sample of a product having 56.2% cis content had a tensile strength of 7.30 MPa, an elongation at break of 413% and a 300% modulus of 3.85. This compares with a mixture of homopolymers of high trans and high cis content, the mixed homopolymer having a cis content of 47.2% which had a tensile strength of 3.68 MPa, an elongation at break of 457% and a 300% modulus of 2.49 when tested under the same conditions.

EXAMPLES 24-27

In these examples butadiene was polymerised with styrene (25% weight) added using a catalyst comprising (a) didymium versatate (DiV) (b) magnesium dibutyl and (c) lithium butyl (BuLi), component (c) being used at a different level in each example. Component (b)

concentration was 2.6 mMole/100 g. of butadiene and the mole ratio (a):(b) was 0.06:1. Results (% conversion, polymer microstructure and percent styrene incorporation) after polymerisation for 16 hours at 50°C. in hexane are shown in the table. The first quoted result is a control using lithium butyl alone.

| Ex No. | DiV:MgBu$_2$:BuLi | Conversion % | Trans % | Cis % | Vinyl % | St % |
|---|---|---|---|---|---|---|
| Control - BuLi only | | 95.6 | 49.2 | 42.1 | 8.7 | 24.2 |
| 24 | 0.06:1:0.6 | 73.6 | 89.3 | 7.8 | 2.9 | 5.1 |
| 25 | 0.06:1:0.8 | 76.5 | 82.1 | 13.3 | 4.6 | 9.4 |
| 26 | 0.06:1:1.0 | 92.6 | 68.8 | 24.8 | 6.2 | 17.8 |
| 27 | 0.06:1:1.2 | 98.4 | 56.7 | 35.7 | 7.6 | 23.3 |

I claim:

1. A process for the preparation of a block copolymer of one or more conjugated dienes comprising a first block having a high content of trans isomer and a second block having a high content of cis isomer by a sequential polymerisation in which:

the first block is prepared in a first stage using a catalyst comprising (a) a salt of a rare earth element or a complex of a rare earth element and (b) a dialkyl magnesium compound; and the second block is prepared in a second stage using a Lewis Acid as an additional catalyst component, (c), in a mole ratio of (c):(b) of a least 0.5:1, added partway through the polymerisation.

2. A process according to claim 1 wherein the block copolymer comprises a first block of high trans polybutadiene and a second block of high cis polybutadiene.

3. A process according to claim 1 wherein the block copolymer comprises a first block of high trans polybutadiene and a second block of high cis polyisoprene.

4. A process according to claim 1 wherein both the first and second blocks are prepared from two or more conjugated dienes.

5. A process according to claim 1 wherein component (a) is a rare earth carboxylate, a rare earth alkoxide or a rare earth diketone complex.

6. A process according to claim 5 wherein the rare earth element of component (a) is neodymium or a mixture of neodymium, lanthanum and praseodymium.

7. A process according to claim 1 wherein component (b) is dibutyl magnesium.

8. A process according to claim 1 wherein the Lewis Acid used as component (c) is an aluminium alkyl halide.

9. A process according to claim 8 wherein component (c) is ethyl aluminium sesquichloride or ethyl aluminium sesquibromide.

10. A process according to claim 1 wherein the mole ratio of (c):(b) is 0.5:1 to 2:1.

* * * * *